E. S. BEANE.
MEANS FOR ADJUSTING HEADLIGHTS.
APPLICATION FILED DEC. 28, 1915.
1,259,476.
Patented Mar. 19, 1918.
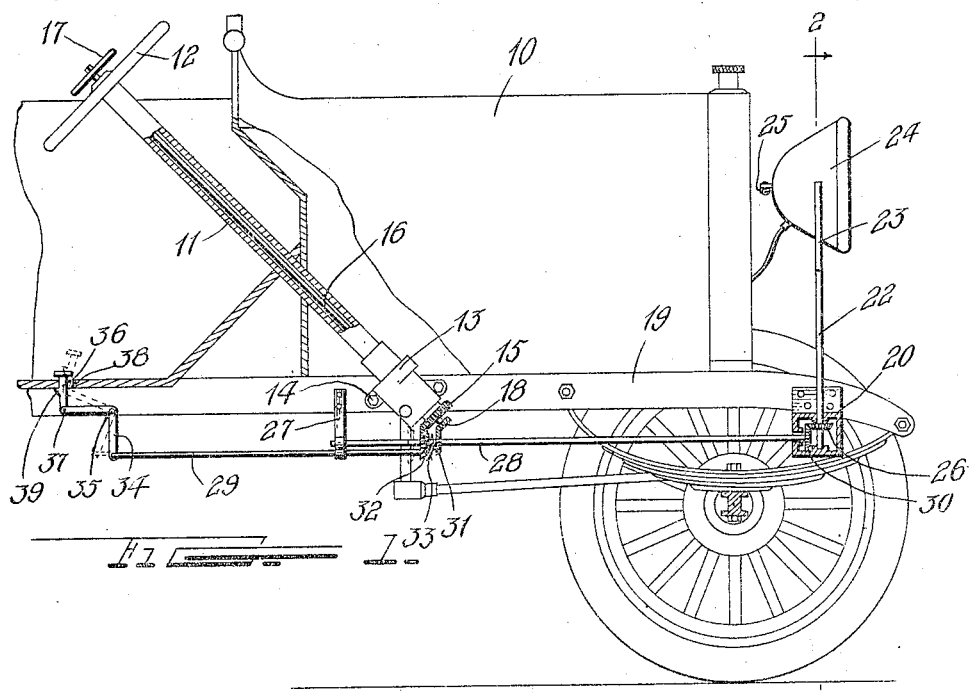
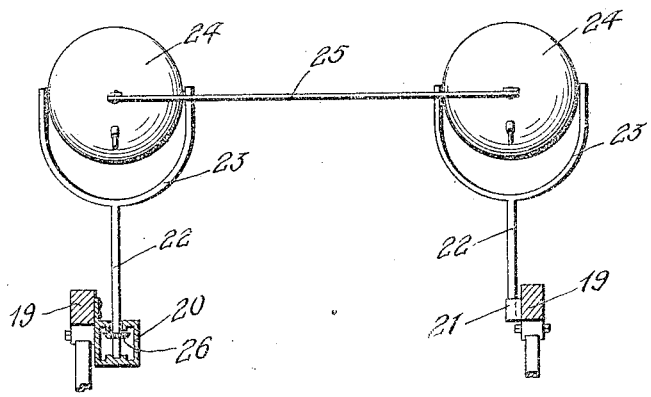
WITNESSES
INVENTOR
Earl S. Beane.
BY
ATTORNEY

UNITED STATES PATENT OFFICE.

EARLE S. BEANE, OF WALDOBORO, MAINE.

MEANS FOR ADJUSTING HEADLIGHTS.

1,259,476.

Specification of Letters Patent. Patented Mar. 19, 1918.

Application filed December 28, 1915. Serial No. 69,087.

*To all whom it may concern:*

Be it known that I, EARLE S. BEANE, a citizen of the United States, residing at Waldoboro, in the county of Lincoln and State of Maine, have invented certain new and useful Improvements in Means for Adjusting Headlights, of which the following is a specification.

My present invention has relation to certain new and useful improvements in means for adjusting headlights on automobiles and other similar motor driven vehicles; and as its primary object, it contemplates the provision of novel mechanism, whereby the headlights may be moved in consistence with the actuation of the steering mechanism or moved independently thereof, in accordance with the desire of the operator.

A further object of my invention is to provide a device of the type in question that is extremely simple in construction, strong and durable, and highly practical from the standpoint of the manufacturer and the standpoint of the user; and which, it is believed, may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Figure 1 is a fragmentary view of an automobile of substantially the conventional form, showing my invention as in its preferred embodiment, in conjunction therewith;

Fig. 2 is a view in detail showing more clearly the manner of connecting the head lights.

In reducing my invention to practice, I first provide the body 10 of the automobile with a hollow steering post 11 that may be mounted in the usual manner, carrying the usual steering wheel 12 at its upper end. The lower end of the steering post is journaled in a suitable bracket 13 which may be fixed to the body of the machine as at 14 and at its free terminals carries a gear wheel 15 that serves a purpose that will subsequently appear. It is well known that in order to turn an automobile to the right, the steering wheel must be turned to the right, or clock-wise and to turn the automobile leftward, the wheel must be turned contra-clock-wise; and therefore, it is deemed unnecessary to show the connections of the steering shaft 11 with the front wheels of the machine. An actuating shaft 16 is mounted to operate interiorly of the steering post 11, the upper end thereof carrying a suitable operating portion 17, above the steering wheel 12, while its lower end is provided with a gear wheel 18 to be arranged in spaced relation with the gear wheel 15 of the steering post.

The respective bolsters 19 of the machine may now be provided with supporting bearings 20 and 21 respectively, for receiving the lower end of the staffs 22, the latter being forked as at 23 at their upper ends, to support the headlights 24. The headlights may be in turn connected through the medium of a cross rod 25.

Interiorly of the bearing 20, one of the staffs 22 is provided with a beveled gear 26, as clearly shown in Figs. 1 and 2 whereby the same may be operated so as to impart simultaneous movement to each of the headlights.

I further provide one of the bolsters 19 with a supporting bracket 27 that supports one end of a shaft 28, whose other end is journaled in the bearing 20, as clearly shown in Fig. 1, while it also supports a rod or shifter element 29 to be movable with respect thereto. The shaft 28 is in turn provided at one end with a gear 30, to mesh with the gear 26 above mentioned, and another gear 31 to mesh with the gear 18 of the shaft 16. Another gear 32 is mounted on the shaft 28 to rotate therewith and to be slidable longitudinally on the shaft 28 against the tension of a spring 33 and is in the path of one end of the rod or shifter element 29 whereby it may be properly actuated when said shaft 29 is shifted forward. The spring 33 continually tends to hold the gear 32 out of mesh with the gear 15, in opposition to the detaining means hereinafter described.

With a view of providing means to properly actuate the push-rod 29, I employ a bell crank lever 34 which may be pivoted to the body of the machine as at 35, one arm thereof having pivotal connection with the other end of the rod 29, as clearly shown in Fig. 1. A pedal 36 is in turn connected with the other end of the bell crank lever, as at 37, to operate through a slot 38 of the bottom of the body, as shown in Fig. 1, the pedal in turn carrying a lug 39 whereby the pedal may be held in its depressed or operative position for maintaining engagement of the gears 15 and 33, in opposition to the tendency of the spring to disengage these gears from one another, as shown in Fig. 1. The elements 20, 22, 25, 26, 28, 30 and 31 inclusive, may be termed the headlight controlling mechanism, in contradistinction to the other elements of the machine.

The operation of my invention is as follows:—

When the parts are in the position shown in full lines, Fig. 1, and the gear wheels 15 and 32 respectively are in co-meshing engagement, the head lights will be adjusted in consistence with the actuation of the steering post. However, by disengaging the lug 39 of the pedal 36 and allowing the same to move to the position shown in dotted lines in Fig. 1, the gear wheel 32 will be forced out of engagement with the gear wheel 15, through the medium of the coil spring 33, so that the head lights may be adjusted independently of the actuation of the steering post. In other words, when the gear wheel 32 is out of mesh with the gear wheel 15, the operator may grasp the operating portion 17 of the shaft 16 and move the same so as to obtain the desired adjustment of the headlights. When the gear wheels 15 and 32 are in co-meshing engagement, the headlights will be adjusted in accordance with the actuation of the steering post as before described which is very desirable when traveling on country roads since the headlights will be moved in consistence with the movement of the front wheels of the machine to always shine directly in front thereof. On the other hand, should the operator be at loss to ascertain in just which direction the road turns, the pedal 36 may be operated so as to disengage the gear wheels 15 and 32 and the headlights may be moved in opposite directions, until the desired route may be found.

From the foregoing, it is believed that the advantages and novel features of my invention will be readily understood and, therefore, further detail description is deemed unnecessary.

In reducing my invention to practice, I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention, what I claim as new and desire to secure by Letters Patent is:—

1. The combination with a vehicle including movably mounted headlights and steering mechanism, of headlight controlling mechanism, means coöperatively connected continually with said headlight controlling mechanism and operable independently of said steering mechanism for turning the headlights, a driving member operable by movement of said steering mechanism, a driven member movable into and out of coöperative relation with said driving member and being coöperatively related to said headlight controlling mechanism for operating the latter, means tending continually to break the coöperative relation of said driving and driven members, and means operable in opposition to the second said means for restoring the coöperative relation of said driving and driven members.

2. The combination with an automobile, including a hollow steering post and movable headlights, of a shaft mounted to be movable independently of said steering post, a gear wheel fixed to said steering post, another gear wheel fixed to said shaft, means to be brought into engagement with said first mentioned gear wheel whereby said headlights may be actuated simultaneously with the movement of said steering post, and means normally in mesh with said second mentioned gear wheel whereby said headlights may be operated independently of movement of said steering post, as and for the purpose specified.

3. In a device of the character described, the combination with an automobile including a hollow steering post and a steering wheel therefor, of a shaft mounted to extend interiorly of said steering post, and be movable independently with respect thereto, a gear wheel keyed to said steering post, a second gear wheel keyed to said shaft, means including a gear wheel to be brought into engagement with said first mentioned gear wheel at certain times whereby the headlights of the automobile may be operated consistently with movement of said steering post and means permanently meshing with said second mentioned gear wheel whereby the headlights may be operated independently of movement of the steering post, as and for the purpose specified.

In testimony whereof I affix my signature in presence of two witnesses.

EARLE S. BEANE.

Witnesses:
WALLACE H. BEAN,
HADLEY H. KUHN.